United States Patent
Fu et al.

(10) Patent No.: US 10,902,302 B2
(45) Date of Patent: Jan. 26, 2021

(54) STACKED NEURAL NETWORK FRAMEWORK IN THE INTERNET OF THINGS

(71) Applicant: International Business Machines Corporation, Armonk, NY (US)

(72) Inventors: Zhiwen Fu, Beijing (CN); Yu Song, Beijing (CN); Xiao Tian Xu, Chang De (CN)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 15/959,749

(22) Filed: Apr. 23, 2018

(65) Prior Publication Data
US 2019/0325276 A1  Oct. 24, 2019

(51) Int. Cl.
*G06K 9/66* (2006.01)
*G06N 3/08* (2006.01)
(Continued)

(52) U.S. Cl.
CPC ............. *G06K 9/66* (2013.01); *G06K 9/6267* (2013.01); *G06N 3/04* (2013.01); *G06N 3/08* (2013.01); *H04L 67/12* (2013.01)

(58) Field of Classification Search
CPC ...... G06K 9/6267; G06K 9/6271; G06K 9/66; G06N 3/04; G06N 3/0454; G06N 3/063;
(Continued)

(56) References Cited

U.S. PATENT DOCUMENTS 9,633,306 B2  4/2017 Liu et al.
9,760,827 B1  9/2017 Lin
(Continued)

FOREIGN PATENT DOCUMENTS

WO  PCT-2007027452 A1  3/2007

OTHER PUBLICATIONS

"A New Lightweight, Modular, and Scalable Deep Learning Framework", Caffe2, Last printed Feb. 16, 2018, 4 pages, <https://caffe2.ai/>.
(Continued)

*Primary Examiner* — Nirav G Patel
(74) *Attorney, Agent, or Firm* — Daniel M. Yeates

(57) ABSTRACT

A method for dividing, by a training system, a computational training work load of one or more neural network layers; pre-training the one or more neural network layers with a first class of image data sensitive to an original known dataset; generating a first weight file from the first layer of the neural network based on the first class of image data sensitive to the original known dataset; loading the one or more pre-trained neural network layers and the generated first weight file into at least one Internet of Things (IoT) device; stacking the one or more pre-trained neural network layers with the first layer of the neural network to form a new training system for an uploaded new dataset; adjusting the generated first weight file based on an input of one or more new classes of image data comprised in the uploaded new dataset to generate a new second weight file; inferencing an object class of new image data comprised on the uploaded new dataset using the generated new second weight file; and outputting the inferenced object class of the new image data.

20 Claims, 7 Drawing Sheets

(51) Int. Cl.
 *G06K 9/62* (2006.01)
 *G06N 3/04* (2006.01)
 *H04L 29/08* (2006.01)

(58) Field of Classification Search
 CPC .......... G06N 3/08; G06N 3/084; H04L 67/12; H04W 4/70
 See application file for complete search history.

(56) References Cited

U.S. PATENT DOCUMENTS

| | | | |
|---|---|---|---|
| 10,140,573 | B2 | 11/2018 | Julian et al. |
| 10,410,121 | B2 | 9/2019 | Husain |
| 2005/0283450 | A1 | 12/2005 | Matsugu |
| 2016/0086078 | A1* | 3/2016 | Ji .................. G06K 9/4628 382/157 |
| 2016/0328644 | A1 | 11/2016 | Lin |
| 2016/0350649 | A1 | 12/2016 | Zhang |
| 2017/0256254 | A1 | 9/2017 | Huang |
| 2019/0279082 | A1* | 9/2019 | Moloney ............. G06K 9/4628 |

OTHER PUBLICATIONS

Lane, et al., "An Early Resource Characterization of Deep Learning on Wearables, Smartphones and Internet-of-Things Devices", IoT-App '15 Proceedings of the 2015 International Workshop on Internet of Things towards Applications, Seoul, South Korea—Nov. 1-1, 2015, pp. 7-12.

Lane, et al., "Can Deep Learning Revolutionize Mobile Sensing?", HotMobile '15 Proceedings of the 16th International Workshop on Mobile Computing Systems and Applications, Santa Fe, New Mexico, USA—Feb. 12-13, 2015, pp. 117-122.

Mell et al., "The NIST Definition of Cloud Computing", National Institute of Standards and Technology, Special Publication 800-145, Sep. 2011, 7 pages.

* cited by examiner

STACKED NEURAL NETWORK FRAMEWORK IN THE INTERNET OF THINGS

BACKGROUND

The present disclosure relates to training neural networks, and, more specifically, to reducing neural network computation complexity in the Internet of Things (IoT).

Neural networks are made up of artificial or neuron-like node structures that have learnable weights and biases (e.g., weight files), used to classify images.

SUMMARY

Aspects of the present disclosure are directed to a method for dividing, by a training system, a computational training work load of one or more neural network layers. The computational training work load can be divided into a first layer and a second layer, with the first layer comprising one or more first sub-layer sequences and the second layer comprising one or more second sub-layer sequences. The method can further comprise pre-training the one or more neural network layers with a first class of image data sensitive to an original known dataset, where pre-training creates identifiable labels for the one or more neural network layers. The method can further comprises generating a first weight file from the first layer of the neural network based on the first class of image data sensitive to the original known dataset. The method can further comprise loading the one or more pre-trained neural network layers and the generated first weight file into the front-end of at least one Internet of Things (IoT) device. The method can additionally comprise stacking, at the front-end of the at least one IoT device, the one or more pre-trained neural network layers with the first layer of the neural network to form a new training system for an uploaded new dataset. The method can additionally comprise adjusting, in the second layer, the generated first weight file based on an input of one or more new classes of image data comprised in the uploaded new dataset to generate a new second weight file. Next, the method can comprise inferencing, directly on the at least one IoT device, an object class of new image data comprised on the uploaded new dataset using the generated new second weight file. Lastly, the method can comprise outputting, at the back end of the IoT device, the inferenced object class of the new image data.

Aspects of the present disclosure are directed to a system comprising a computer readable storage medium storing a corpus of data, a user interface configured to receive input and present output and a processor communicatively coupled to the computer readable storage medium and the user interface and having a memory comprising instructions. The instructions can be configured to divide, by a training system, a computational training work load of one or more neural network layers. The computational training work load can be divided into a first layer and a second layer, with the first layer comprising one or more first sub-layer sequences and the second layer comprising one or more second sub-layer sequences. The instructions can further be configured to pre-train the one or more neural network layers with a first class of image data sensitive to an original known dataset, where pre-training creates identifiable labels for the one or more neural network layers. The instructions can further be configured to generate a first weight file from the first layer of the neural network based on the first class of image data sensitive to the original known dataset. The instructions can further be configured to load the one or more pre-trained neural network layers and the generated first weight file into the front-end of at least one Internet of Things (IoT) device. The instructions can additionally be configured to stack, at the front-end of the at least one IoT device, the one or more pre-trained neural network layers with the first layer of the neural network to form a new training system for an uploaded new dataset. The instructions can additionally be configured to adjust, in the second layer, the generated first weight file based on an input of one or more new classes of image data comprised in the uploaded new dataset to generate a new second weight file. Next, the instructions can be configured to inference, directly on the at least one IoT device, an object class of new image data comprised on the uploaded new dataset using the generated new second weight file. Lastly, Next, the instructions can be configured to output, at the back end of the IoT device, the inferenced object class of the new image data.

Aspects of the present disclosure are further directed to a computer program product. The computer program product comprises a computer readable storage medium having program instructions embodied therewith, the program instructions, executable by a processor. The program instructions can cause the processor to divide, by a training system, a computational training work load of one or more neural network layers. The computational training work load can be divided into a first layer and a second layer, with the first layer comprising one or more first sub-layer sequences and the second layer comprising one or more second sub-layer sequences. The program instructions can further cause to processor to pre-train the one or more neural network layers with a first class of image data sensitive to an original known dataset, where pre-training creates identifiable labels for the one or more neural network layers. The program instructions can further cause to processor to generate a first weight file from the first layer of the neural network based on the first class of image data sensitive to the original known dataset. The program instructions can further cause to processor to load the one or more pre-trained neural network layers and the generated first weight file into the front-end of at least one Internet of Things (IoT) device. The program instructions can additionally cause to processor to stack, at the front-end of the at least one IoT device, the one or more pre-trained neural network layers with the first layer of the neural network to form a new training system for an uploaded new dataset. The program instructions can additionally cause to processor to adjust, in the second layer, the generated first weight file based on an input of one or more new classes of image data comprised in the uploaded new dataset to generate a new second weight file. Next, the program instructions can further cause to processor to inference, directly on the at least one IoT device, an object class of new image data comprised on the uploaded new dataset using the generated new second weight file. Lastly, Next, the instructions can be configured to output, at the back end of the IoT device, the inferenced object class of the new image data.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
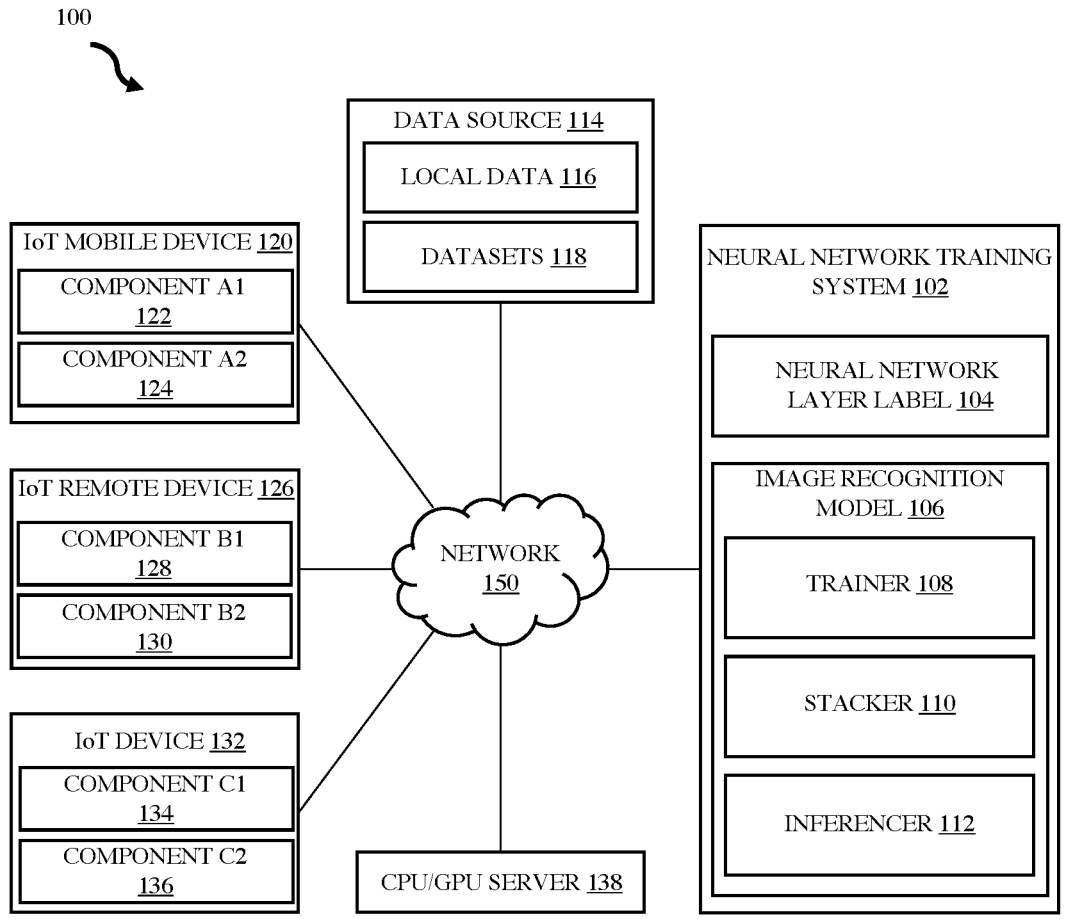
FIG. 1 illustrates a block diagram of an example Internet of Things (IoT) environment in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward training neural networks, and, more specifically, to reducing neural network computation complexity to adjust a weight file in devices connected throughout the Internet of Things (IoT). While the present disclosure is not necessarily limited to such applications, various aspects of the present disclosure may be appreciated through a discussion of various examples using this context.

The IoT can be a network of physical devices generating and sharing data. Physical devices can be, but are not limited to, information processing devices (e.g., computers, laptops, desktops, satellites, etc.), transportation devices (e.g., vehicles, busses, trains, planes, etc.), home devices (e.g., security controls, etc.), consumer devices (e.g., mobile phones, tablets, handheld devices, wearable devices, etc.), manufacturing devices (e.g., 3D printers, etc.), and other devices having electronics, hardware, software, sensors, actuators, and/or network connectivity.

The IoT has applications in many industries such as, but not limited to, manufacturing (e.g., automation, process control, quality control, etc.), utilities (e.g., smart grids, power management, etc.), transportation (e.g., autonomous vehicles, traffic control, etc.), consumer (e.g., smart homes, etc.), defense (e.g., surveillance, security), healthcare (e.g., health monitoring, etc.), and so on.

The IoT is susceptible to challenges when implementing deep learning. For example, one type of challenge is the low computation capability. Low computation capability limits the dynamic range and inference ability of numerous devices in an IoT environment. Thus, low computation capability can inhibit model adjustments (e.g., weight files generated from one or more class of object) and the migration process throughout multiple devices in an IoT environment. Model adjustments can occur approximately concurrently or within a same interval of time. The model adjustments can collectively alter the functionality, performance, security, or utility of the IoT environment. For example, limited network bandwidth and storage for high resolution data can be accessible to a portion of an IoT environment.

Aspects of the present disclosure pre-train and integrate one or more neural network layers with deep learning methods in an IoT environment by dividing the training workflow, as it is typically not possible to adjust a trained neural network model starting from an intermediate stage. The training workflow can comprise pre-trained networks (e.g., model zoo), transfer learning (e.g., knowledge transfer), feature extraction (e.g., convolutional neural networks (CNN)) and deep learning model designs (e.g., stacked neural networks).

As may be understood by one skilled in the art, in conventional neural networks, the first stage of a convolutional neural network is executed in the convolutional layer. Input can then be passed from the convolutional layer to a non-linear layer (e.g., Rectified Linear Units (ReLU) Layer). In conventional neural networks, a pooling layer can be applied after a convolutional or ReLU layer. Conventional neural networks comprise training stages between layers of convolutional neural networks. Nodes comprised in the training stage are processed with weights relating to a set of predetermined numbers stored in the program. With image related work, training between layers in conventional neural networks becomes computationally intensive, more often, resulting in decreased processing time. Lastly, an output is executed through a fully connected layer. Aspects of the present disclosure relate to improving the computational intensiveness of neural networks comprised in the IoT.

Adjusting the weight file in an IoT environment can be difficult for numerous reasons. For example, neural networks in deep learning are typically run on powerful graphic processing units (GPUs) for a long duration of time with excessive amounts (e.g., hundreds) of gigabyte data in order to use a weight file for image inference and prediction. However, if the neural network is responsible for identifying an alternative class of image data (e.g., categories, conditions, etc.), the entire neural network workflow must be restarted, resulting in excessive computation complexity (e.g., forward pass, backward propagation, max pooling, etc.).

Aspects of the present disclosure advantageously overcome this disadvantage by passing over the convolution part (e.g., feature abstraction layer) of the training process, so a new class of images need only be trained in a classification layer to be recognized in the IoT devices comprising less computing ability. For example, if an additional class of images are detected in the IoT during an initial computation of a first set of images, the additional class of images can be passed to the classification training part to adjust their weight file without restarting identification in the convolutional layer. Thus, aspects of the present disclosure can migrate model adjustments throughout the IoT environment.

Aspects of the present disclosure realize numerous advantages. For example, aspects of the present disclosure improve the functioning of devices in an IoT environment by applying deep learning to the IoT devices quickly and easily. For example, aspects of the present disclosure can benefit picture regeneration by back propagation and image compression.

As another example advantage, aspects of the present disclosure are flexible both for IoT devices and backend applications. Thus, aspects of the present disclosure are proactive (e.g., efficient) instead of reactive (e.g., inefficient). Aspects of the present disclosure are capable of retraining fully connected layers at any time throughout image classification. Additionally, the aspects comprised in the neural network are stackable, thus enabling generic feature extraction.

The aforementioned advantages are example advantages and embodiments exist that contain all, some, or none of the aforementioned advantages while remaining within the spirit and scope of the present disclosure.

Thus, aspects of the present disclosure are necessarily rooted in computer technology at least insofar as aspects of the present disclosure train neural networks in an IoT environment. Aspects of the present disclosure exhibit at least improved detection (e.g., earlier detection of image classification), improved accuracy (e.g., fewer false positives), and improved computational performance (e.g., a robust IoT environment) relative to known solutions.

Referring now to FIG. 1, illustrated is a block diagram of an example IoT environment 100. IoT environment 100 can include numerous components communicatively coupled by a network 150 such as, but is not limited to, neural network training system 102, data source 114, a plurality of devices (e.g., IoT mobile device 120, IoT remote device 126, and IoT device 132), and a Graphic Processing Unit/Computer Processing Unit (GPU/CPU) server 138.

Neural network training system 102 can include neural network layer labeler 104. Neural network layer labeler 104 can be configured to identify visual data (e.g., objects, images, videos) for respective devices in IoT environment 100 based on local data collected from the respective devices (e.g., IoT mobile device 120, IoT remote device 126, and IoT device 132) and label each neural network layer for a specific class of objects they are related to (e.g., human, vehicle, structure, condition etc.).

Neural network layer labeler 104 can identify visual data based on, for example, features (e.g., edges, corners, interest points, blobs, ridges etc.), characteristics (e.g., color, shadow, texture, intensity etc.), segmentation (e.g., image, etc.), tracking (e.g., video, particle, etc.) or other factors to generate a respective label classification for a respective neural network layer. For example, a neural network layer related to vehicle identification can be labeled as "vehicle identification neural network layer."

In some embodiments, neural network labels are based on one or more counts of information. That is to say, in some embodiments, neural network labels are in a format (e.g., easily identifiable keywords) conducive to analysis using one or more pre-trained neural network (e.g., a neural network sensitive to specific known datasets). In some embodiments, respective labeled neural network layers can be reused to train part of a neural network for new visual data. In some embodiments, respective neural network layer labels can be in a vector format where respective numbers in the vector correspond to respective types of information collected from a respective object. In some embodiments, respective neural network layer labels can be in a matrix format where respective rows (or columns) can correspond to multiple pieces of information collected from a component of a neural network and where respective columns (or rows) correspond to respective components within the layer.

In still other embodiments, respective neural network labels can be compiled for sets of visual data such that, for example, respective numbers in a respective vector neural network layer correspond to respective labels in the set of devices, or, alternatively, where respective sets of numbers (e.g., rows or columns) in a respective matrix neural network layer correspond to respective vectors of data collected from respective labels in the set of devices.

Neural network training system 102 can further include image recognition model 106. Image recognition model 106 can be configured to identify objects based on neural network layer labels generated by neural network layer labeler 104. Image recognition model 106 can include trainer 108. Trainer 108 can be configured to pre-train front-end neural network layers which are generic, dataset sensitive and identifiable. Trainer 108 is discussed in more detail with respect to FIG. 3. Image recognition model 106 can further included stacker 110. Stacker 110 can be used to load pre-trained neural network layers into respective IoT devices (e.g., IoT mobile device 120, IoT remote device 126, and IoT device 132) and dynamically form a neural network using previous identified pre-trained neural network layers. Stacker 110 is discussed in more detail with respect to FIG. 3. Image recognition model 106 can further include infrencer 112. Infrencer 112 can determine that the new class of new image data can enable respective devices in the IoT environment 100 to be more flexible for various local image data in terms of re-training. Inference 112 is discussed in further detail with respect to FIG. 3.

Neural network training system 102 can collect and distribute visual data from IoT mobile device 120, IoT remote device 126, and IoT device 132. IoT mobile device 120 can include component A1 122 and component A1 124. Likewise, IoT remote device 126 can include component B1 128 and component B2 130. Likewise, IoT device 132 can include component C1 134 and component C2 136. Although device IoT mobile device 120, IoT remote device 126, and IoT device 132 are each shown with two components, each device can contain more or fewer components. Although three devices are shown (one IoT mobile device 120, one IoT remote device 126, and one IoT device 132), embodiments exist containing more or fewer devices (e.g., tens, hundreds, etc.) and embodiments exist containing more or fewer types of devices (e.g., mobile, remote). IoT mobile device 120, IoT remote device 126, and IoT device 132 can be similar or dissimilar IoT devices such as, but not limited to, computers, servers, vehicles, industrial equipment, infrastructure, wearable devices, handheld devices, smartphones, tablets, network components, sensors, security cameras, and so on. Respective components (e.g., component A1 122, component B1 128, component 134 C1) in respective devices can be portions of the device used to inference the class of visual data. Respective components in respective devices (e.g., component A2 124, component B2 130, and component C2 136) can be portions of the devices generating the vector size of the image. For example, components can be, but are not limited to, sensors (e.g., temperature sensors, velocity sensors, acceleration sensors, pressure sensors, vibration sensors, movement sensors, global positioning system (GPS) sensors, etc.), memories (e.g., solid state memory, flash memory, volatile memory, non-volatile memory, etc.), processors, network cards, power units, electrical connections and/or cabling, fiber optic connections and/or cabling, displays, actuators, throttles, motors, valves, and so on.

Data source 114 can include local data 116 and datasets 118. Although only one data source 114 is shown in FIG. 1 for purposes of illustration, it is to be understood that more than one data source can be included in other embodiments. Local data 116 can include a history of visual data generated by the devices (e.g., IoT mobile device 120, IoT remote device 126, and IoT device 132).

Datasets 118 can include data regarding generic visual image data (e.g., humans, cars, structures, etc.) and motion recording data (e.g., video) (hereinafter referenced and encompassed as image data) not obtained from the devices (e.g. IoT mobile device 120, IoT remote device 126, and IoT device 132. In some embodiments, datasets 118 can be used by image recognition model 106 to pre-train neural networks comprising generic and specific data.

GPU/CPU server 138 can communicate information from neural network training system 102 to other components to be used for further processing done by conventional systems on this type of data. GPU/CPU server 138 can receive input such as, for example, original training data.

FIG. 1 is intended to represent illustrative components of an example IoT environment 100 according to embodiments of the present disclosure. In some embodiments, however, individual components can have greater or lesser complexity than shown in FIG. 1, and components other than, or in addition to those shown in FIG. 1 can be present. Furthermore, in some embodiments, various components illustrated in FIG. 1 can have greater, lesser, or different functionality than shown in FIG. 1.

Figure 2:
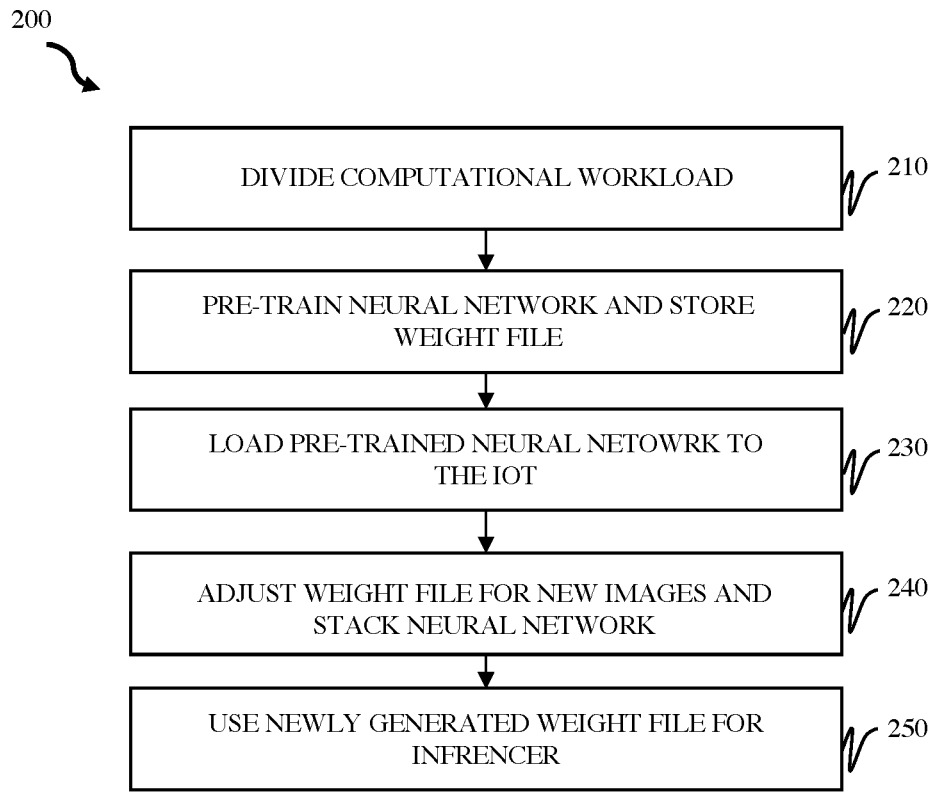
FIG. 2 illustrates a flowchart of an example method for pre-training neural networks in an IoT environment in accordance with some embodiments of the present disclosure.

Referring now to FIG. 2, illustrated is an example method 200 for pre-training neural networks in an IoT environment in accordance with some embodiments of the present disclosure. The method 200 can be performed by, for example, one or more processors, a neural network training system (e.g., neural network training system 102 of FIG. 1), or a different configuration of hardware. For clarity, the method 200 will be described as being performed by neural network training system, however, aspects of the present disclosure can be performed by other hardware components or combinations of hardware components. In some embodiments, aspects of the method 200 are consistent with IoT environment 100 of FIG. 1.

In operation 210, the neural network training system can collect device data from a plurality of devices communicatively coupled in a network and divide the computational workload of a deep learning neural network comprised within, for image recognition. In embodiments, the plurality of devices can comprise an IoT environment (e.g., IoT environment 100 of FIG. 1). Computational workload can include, but is not limited to, the amount of processing required for an input image to be processed through convolutional layers (e.g., forward pass derivative, backpropagation, dropout layers, etc.) and sub-sampling layers (e.g., pooling, max-pooling) and/or fully connected layers and Gaussian connections. The computational workload can be divided by components of the neural network training systems (e.g., image recognition model) and can further separate into two separate training layers comprising a first feature abstraction layer with one or more sub-layer iteration sequences between one or more convolutional layers and one or more sub-sampling layers and a second classification layer with one or more sub-layer iteration sequences between one or more fully connected layers and one or more Gaussian connection.

A dataset obtained from one or more data sources (similar to data source 114 of FIG. 1), can be uploaded to a device in the IoT environment (similar to IoT mobile device 120, IoT remote device 126, and IoT device 132 of FIG. 1). The dataset can comprise for example, trainable generic class image data including a plurality of general category labels (e.g., living, machine) and annotations of a third-party image to indicate the presence or absence of a known class of objects in an image. Image data can be based on the data collected from each respective IoT device and each IoT device can be connected to one or more data sources comprising generic image data via wired or wireless connection.

In operation 220, IoT devices are incorporated into one or more neural network training layers. Neural network layers are pre-trained in the front end via trainer 108 of FIG. 1. Pre-training neural networks in the front end enables future processing sequences to utilize similar framework (similar to framework comprised in FIG. 3) so that computational steps are continued rather than repeated when a new class of image data is uploaded to the neural network training system. Using the dataset obtained from one or more data sources, a first neural network is established to detect the first class of image data and apply an identifying label for future processing. In embodiments, the neural network training system creates and stores a weight file according to one or more counts of information based on generic, dataset sensitive and identifiable collected image data. For example, a respective image data could include an object (e.g., human, machine etc.). The neural network training system pre-trains the first layer neural network to detect similar nodes in future images. Eventually with the weight file, the front end of the neural network can be pre-trained to identify sensitive and specific known images in subsequent datasets. For example, the neural network can be pre-trained to identify a specific individual rather than joust generically representing a human. In various embodiments, categories of known datasets can be isolated by a user or specified into targeted areas based on user preference. Operation 220 can result in a pre-trained feature abstraction neural network layer.

In operation 230, a distributed environment is created. The neural network training system separates application levels of the generated neural network and uploads via stacker 110, the computational classification layer (e.g., fully connected layer, Gaussian connections), associated generated label and weight file of the dataset comprising the first class of image data, and an inference generated by an inferencer (similar to inferencer 112 of FIG. 1) to devices in the IoT environment. In embodiments, devices in the IoT assume responsibility for processing each image data file of the dataset, through the neural network training system.

In operation 240, the neural network training system distinguishes and labels every neural network layer for the specific class of objects they are relevant to. In embodiments, when a new dataset of images is uploaded to the IoT devices via a subsequent dataset, rather than restarting computations, the original weight file is adjusted and a new weight file relating to the new dataset of images is generated. The pre-trained feature abstraction neural network layer from operation 220 is reused without any adjustments or modifications. With each new image, separate application layers of the neural network, relating to the new class of objects that the new image data comprises, are conditionally stacked. Consequently, the neural network only stores one copy of the pre-trained feature abstraction layer with the original weight file and multiple classification layers with the corresponding adjusted weight files. Each additional separate application neural network layer is then hierarchically stacked so as to train labeled layers of the neural network for datasets comprising similar classes of objects in alternative datasets.

The neural network training system can dynamically form a neural network by loading, activating and stacking dataset sensitive neural networks at the front end of the IoT device. In operation 250, an inferencer (similar to infrencer 112 of FIG. 1) can create a new weight file for a new image in a newly uploaded dataset. With the new weight file, the IoT device can directly identify the corresponding neural network label that the new image is most similarly associated with, use previously identified pre-trained neural networks with conditions (e.g., label) most similarly associated with the new image, bypass the feature abstraction phase, and continue image processing directly to the back end of the IoT device. The fully connected layers of the neural network are trained and stacked at the backend for application task and the IoT device, via a CPU/GPU, outputs the extracted features.

FIG. 2 is intended to represent illustrative operations of an example method for pre-training neural networks in an IoT environment in accordance with some embodiments of the present disclosure. In some embodiments, however, individual operations can have greater or lesser complexity than shown in FIG. 2, and operations in addition to (or in substitution of) those shown in FIG. 2 can be present. Furthermore, in some embodiments, various operations illustrated in FIG. 2 can have greater, lesser, or different functionality than shown in FIG. 2. Furthermore, in some embodiments, various operations illustrated in FIG. 2 can occur in different orders, if they occur at all.

Figure 3:
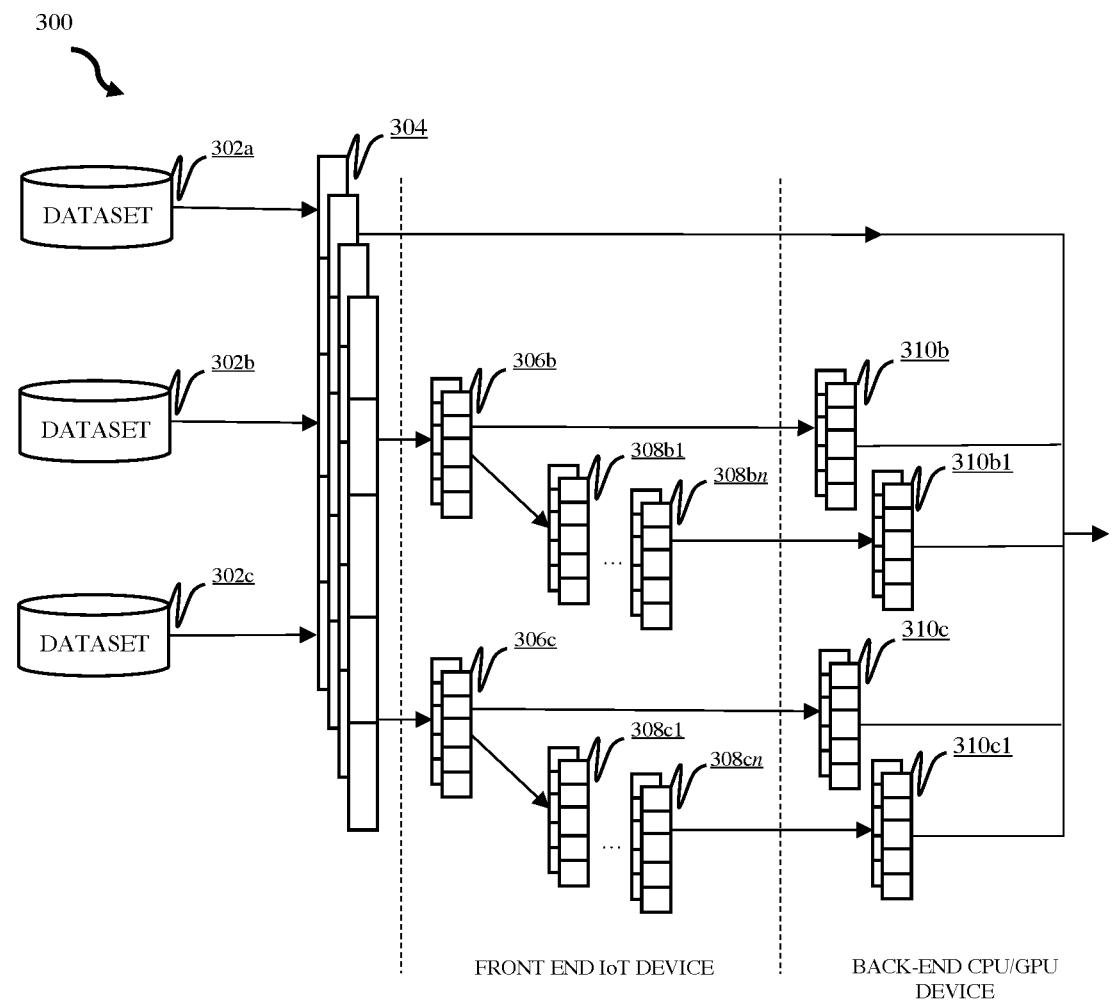
FIG. 3 illustrates a block diagram of an example neural network stacking framework in accordance with some embodiments of the present disclosure.

Referring now to FIG. 3, depicts a neural network stacking framework 300 in accordance with some embodiments of the present disclosure. The method 300 can be performed by, for example, one or more processors, a neural network training system (e.g., neural network training system 102 of FIG. 1), or a different configuration of hardware. For clarity, the method 300 will be described as being performed by neural network training system, however, aspects of the present disclosure can be performed by other hardware components or combinations of hardware components. In various embodiments, neural network stacking framework 300 performs the method described in FIG. 1.

Neural network stacking framework 300 can include a plurality of components coupled by a network (not pictured) (similar to network 150 of FIG. 1) and/or stacked between different application layers. In embodiments, dataset 302$a$ can be processed through a first application layer (top layer) in neural network layer 304. Depending on the class of image data comprised in subsequent datasets, dataset 302$b$ and dataset 302$c$ can pass through feature abstraction of neural network layer 304 and in the front end of an IoT device continue processing in one or more second neural network layers 306 (e.g. 306$b$, 306$c$). Neural network layers relevant towards specific class of images can be stacked in one or more stacked neural network layers 308 (e.g. 308$b$1-308$bn$, 308$c$1-308$cn$). At the backend of a CPU/GPU device, one or more generic action labeled neural network layers (e.g. 310$b$, 310$c$) and one or more specific action labeled neural network (310$b$1, 310$c$1) is constructed to learn an action in one or more visual data file (e.g., image, video recording, etc.) comprised on dataset 302$b$-302$c$ after stacking (via stacker 110 of FIG. 1) one or more stacked neural network layers 308.

As depicted in FIG. 3, the neural network stacking framework 300 can advantageously use a plurality of databases to establish separate labeled neural network layers. For example, in embodiments, the neural network stacking framework 300 can retrieve trainable image training data from a set of datasets 302$a$-$c$. Dataset 302$a$ can comprise image data including generic objects and image classes and can be retrieved from one or more data sources. For purposes of specialized image analysis, subsequent dataset 302$b$ and dataset 302$c$ can be processed through the neural network stacking framework 300 based on the target claim of the neural network training system. In embodiments, the target claim of the neural network training system is dependent upon the user. For example, the target claim can comprise using image recognition to identify a woman and/or a car with a device comprised in the IoT. In example embodiments, dataset 302$b$ can comprise a class of generic image data based on a facial recognition target claim and can include categorical identifiers relating to people and nodes of hierarchical abstraction facial features (e.g., head shape, skin color, etc.). In some example embodiments, dataset 302$c$ can comprise a class of generic image data based on a vehicle recognition target claim and can include categorical identifiers relating to automobiles and nodes of hierarchical abstraction features (e.g., number of doors, type of trunk, etc.). In embodiments, dataset 300$a$-$c$ can be connected, via wired or wireless connection, to a device comprised in the IoT environment and is provided by way of example. Dataset 302$a$-$c$ may comprise greater or lesser complexity and include greater or fewer datasets than discussed herein.

Neural networks sensitive to specific known datasets (e.g., people, vehicles) in user designated target areas are constructed. In embodiments, neural network stacking framework 300 constructs neural network layer 304 to learn the top-level features from one or more data sources, which are commonly prevalent. Neural network layer 304 is pre-trained, using trainer 108 of FIG. 1, with the class of generic image data comprised on dataset 302$a$.

In example embodiments, the neural network stacking framework 300 feeds dataset 302$b$ into the already trained neural network layer 304. The class of generic image data, for example, people, comprised on dataset 302$b$, is used to construct a first, second neural network layer 306$b$, to learn identifiable features from similar images comprised in one or more data source (similar to data source 114 of FIG. 1). Neural network layer 306$b$ is then stacked with neural network layer 304 via stacker 110 of FIG. 1. Stacking neural network layer 306$b$ creates a first stacked neural network layer 308$b$1. Neural network 308$b$1 can be trained with the class of image data only relevant towards a specific feature in the generic image data, for example, women with long hair, in the first, second neural network layer 306$b$. For any additional feature identified and learned in the first, second neural network layer 306$b$, a corresponding nth stacked neural network layer 308$bn$ can be constructed. In embodiments, without repeating computational aspects (similar to computations components disclosed in FIG. 2) in neural network layer 304, based on the class of images in dataset 302$a$, the stacked neural network layer 308$b$1 and stacked neural network layer 308$bn$ are further trained with a class of specific image data of dataset 302$b$ based on the user target claim.

In additional example embodiments, the neural network stacking framework 300 feeds dataset 302$c$ into the already trained neural network layer 304. The class of generic image data, for example, vehicles, comprised on dataset 302$c$, is used to construct a second, second neural network layer 306$c$, to learn identifiable features from similar images comprised in one or more data sources (similar to data source 114 of FIG. 1). Neural network layer 306$c$ is then stacked with neural network layer 304. Stacking neural network layer 306$c$ creates a first stacked neural network layer 308$c$1. Neural network 308$c$1 can be trained with the class of image data only relevant towards a specific feature in the generic image data, for example, car license plate, in the second, second neural network layer 306$c$. For any additional feature identified and learned in the second, second neural network layer 306$c$, a corresponding nth stacked neural network layer 308$cn$ can be constructed. In embodiments, without repeating computational aspects (similar to computations components disclosed in FIG. 2) in neural network layer 304 based on dataset 302$a$, the stacked neural network layer 308c1 and stacked neural network layer 308cn are further trained with a class of specific image data of dataset 302c based on the user target claim.

In embodiments, the stacked neural network layer 308b1 and stacked neural network layer 308c1 can be additionally trained by a class of specific actions (e.g., hand waving, car turning, etc.) comprised in one or more dataset 302 (e.g., dataset 302b-c) and training by a class of specific image data is only presented by way of example. The present embodiments are not limited as such.

In embodiments, the top-level neural network layer 304 and the one or more second neural network layer 306b and 306c are considered to be pre-trained based on dataset 302a, dataset 302b, and dataset 302c respectively. Each pre-trained neural network layer (304, 306b, 306c) is loaded, via stacker 110 of FIG. 1, into resource constrained components (e.g., camera, sensor, etc.) in the front-end of one or more IoT device (e.g., IoT mobile device 120, IoT remote device 126, and IoT device 132 of FIG. 1). In the IoT device, new neural network layers associated with features of a class of image data (e.g., second neural network layer 308b1-bn, second neural network layer 308c1-cn) are constructed.

In example embodiments, a generic action labeled neural network layer 310b is constructed to learn specific actions (e.g., person waving) associated with generic features of the class of image data in dataset 302b. Neural network layer 310b is then stacked with neural network layer 306b by stacker 110 of FIG. 1. Stacking neural network layer 310b creates a second stacked neural network layer (not pictured) with respect to neural network layer 306b. Neural network 310b can be then trained with any action specific dataset without neural network layer 306b.

In further example embodiments, a specific action labeled neural network layer 310b1 is constructed to learn specific actions (e.g., woman waving) associated with specific features of the class of image data in dataset 302b. Neural network layer 310b1 is then stacked with stacked neural network layer 306b1-306bn by stacker 110 of FIG. 1. Stacking neural network layer 310b1 creates a second stacked neural network layer (not pictured) with respect to neural network layer 306b1-306bn. Neural network 310b1 can be then trained with any action specific dataset without neural network layer 306b1-306bn.

In other example embodiments, a second labeled generic action neural network layer 310c is constructed to learn specific actions (e.g., vehicle turning) associated with a class of generic features of image data in dataset 302c. Neural network layer 310c is then stacked with neural network layer 306c. Stacking neural network layer 310c creates a second stacked neural network layer (not pictured) with respect to neural network layer 306c. Neural network 310c can be then trained with any action specific dataset without neural network layer 306c.

In further example embodiments, a second labeled specific action neural network layer 310c1 is constructed to learn specific actions (e.g., car turning) associated with a class of specific features of image data in dataset 302c. Neural network layer 310c1 is then stacked with stacked neural network layer 306c1-306cn. Stacking neural network layer 310c1 creates a second stacked neural network layer (not pictured) with respect to neural network layer 306c1-306cn. Neural network 310c1 can be then trained with any action specific dataset without neural network layer 306c1-306cn.

Data from neural network layer 304, the one or more generic action labeled neural network layer 310b and 310c, and the one or more specific action labeled neural network layer 310b1 and 310c1 is loaded to the backend of the IoT device, such as a GPU and or CPU box (not pictured). In embodiments, when a further specific class of object/action relating to a class of image data comprised in one or more future uploaded dataset 300 is identified, the corresponding neural network layer relating to the specific class of object/action will activate the fully connected neural network layers in the front-end of the IoT device. The new class of image data will begin processing in the corresponding labeled stacked neural network layer 308n relating to the class of input image data. The output classification of the class of new object/action will then be displayed. Stacking fully connected neural network layers is described in more detail herein with respect to FIG. 4.

FIG. 3 is intended to represent illustrative components of an example method 300 for neural network stacking framework in an IoT environment in accordance with some embodiments of the present disclosure. In some embodiments, however, individual components can have greater or lesser complexity than shown in FIG. 3, and components in addition to (or in substitution of) those shown in FIG. 3 can be present. Furthermore, in some embodiments, various components illustrated in FIG. 3 can have greater, lesser, or different functionality than shown in FIG. 3. Furthermore, in some embodiments, various components illustrated in FIG. 3 can occur in different orders, if they occur at all.

Figure 4:
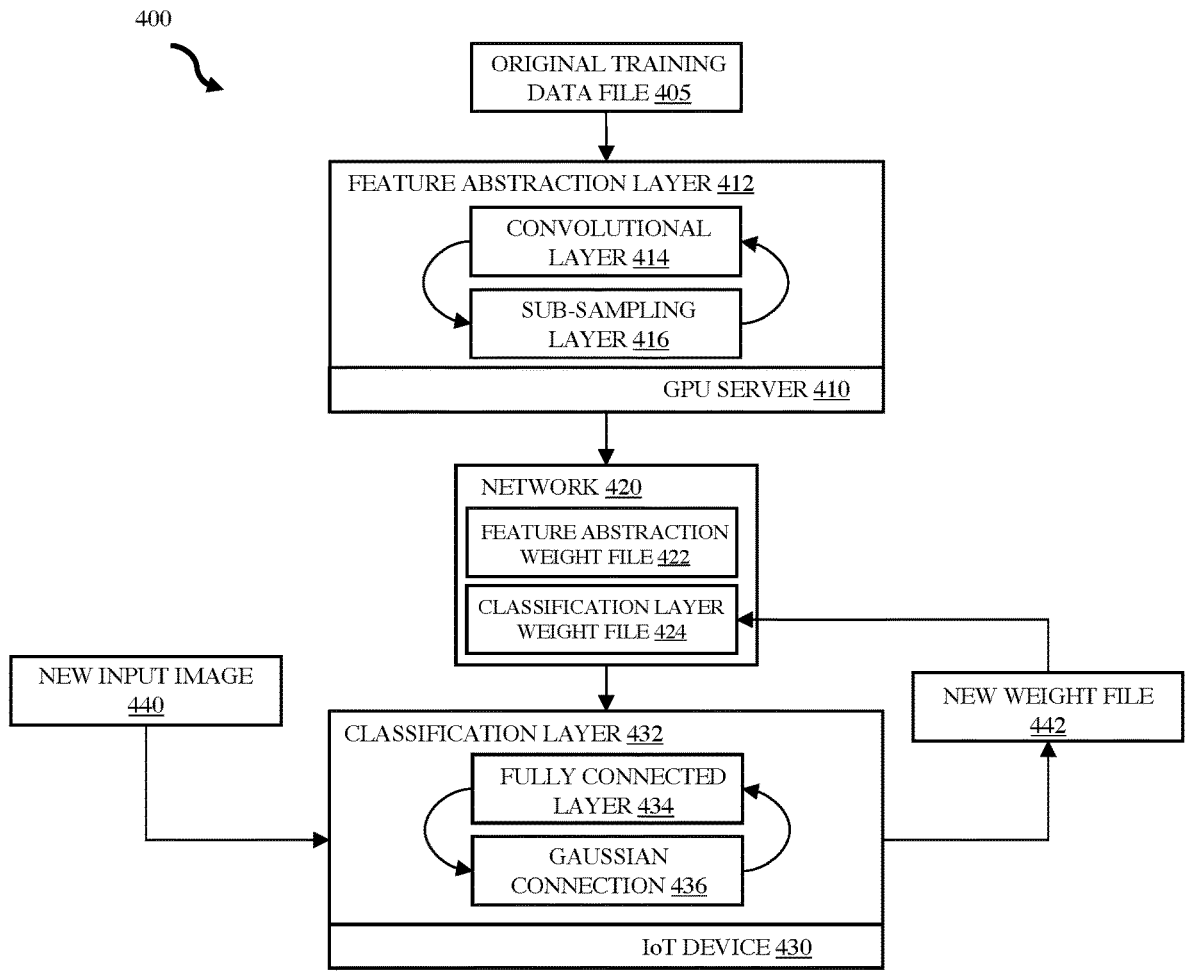
FIG. 4 illustrates a block diagram of an example neural network training architecture in accordance with some embodiments of the present disclosure.

Referring now to FIG. 4, illustrated is an example data flow diagram depicting the workflow of data through a neural network training architecture system 400 in accordance with some embodiments of the present disclosure. In some embodiments, neural network training architecture system 400 is consistent with the neural network training system 102 of FIG. 1, the method 200 of FIG. 2, and the neural network stacking framework 300 of FIG. 3. In various embodiments, neural network training architecture system 400 performs any of the actions described in FIGS. 2 and 3. In some embodiments, the neural network training architecture system 400 performs one or more of the actions described in FIGS. 2-6 in an IoT device 430 such that the IoT device 430 executes the method, or a portion of the method, based on components provided by the neural network training architecture system 400.

The neural network training architecture system 400 can be comprised in a deep learning neural network and include an original training data file 405, one or more GPU servers 410, a cloud network 420 and one or more IoT devices 430. The one or more GPU servers 410 can implement a feature abstraction layer 412 comprising one or more convolution layers 414 and one or more sub-sampling layer 416. The network 420 can store a feature abstraction weight file 422 and one or more classification layer weight files 424. The one or more IoT devices 430 can implement one or more classification layers 432 each comprising one or more fully connected layers 434 and one or more Gaussian connections 436. One or more new input images 440 can be received by the one or more IoT devices 430 which also output one or more new weight files 442.

Using the deep learning neural network for image related work, the original training data file 405 can be uploaded into the feature abstraction layer 412 comprised in a backend application on one or more GPU servers 410. In embodiments, GPU server 410 can be coupled with a CPU to accelerate deep learning applications (similar to GPU/CPU server 138 of FIG. 1). The original training data file 405 can comprise a dataset (similar to one or more datasets 302 of FIG. 3) of a trainable class of image training data. More specifically, original training file 405 can comprise a class of generic image data including categorical identifiers (e.g., image classification) and nodes of hierarchical abstraction features (e.g., object distinctions) retrieved from one or more data sources (e.g., data source 114 of FIG. 1). In embodiments, the original training data file 405 is connected, via wired or wireless connection, to the deep learning neural network.

In conventional neural networks, a typical computational workload for training data of an original or a new image begins within the computational workload of a connected feature abstraction phase and classification phase. However, as depicted in FIG. 4 and similar to operation 220 of FIG. 2, the computational workload of the deep learning neural network is separated into layers and more specifically, divided between the feature abstraction layer 412 and the classification layer 432 by use of a training model (not pictured) (similar to image recognition model 106 of FIG. 1) comprised in a training system. A first class of image data files access the computational components comprised in the feature abstraction layer 412; all new classes and thereinafter classes of input image data files bypass feature abstraction layer 412 and begin processing directly in classification layer 432. Doing so enables an image recognition model (similar to image recognition model 106 of FIG. 1) update, and further enables the infrencer (not pictured) (similar to infrencer 112 of FIG. 1) to merge with classification layer 432 in one or more IoT device so that one or more IoT device are more flexible for local image data.

Data comprised on original training data file 405 is first processed through a sub-layer iteration sequence beginning in convolutional layer 414. In embodiments, convolutional layer 414 is a sub-layer of feature abstraction layer 412 and trains an original class of image data file 405. Convolutional layer 414 convolutes the receptive field of image data file 405 using a filter of neurons and their respective array of weights. In embodiments, the receptive field is the top layer of the input image (i.e., the layer a user sees). Convolutional layer 414 can include additional hidden layers (not pictured) to establish the weight file of image file data by using neural network layers conventional in the art, including but not limited to, one or more forward pass derivative convolutional layers, one or more backward propagation convolutional layers, and/or one or more drop out layers.

A dot product is computed between the filter and the input image producing a two-dimensional activation map of the applied filter. As a result, the deep learning neural network learns filters that activate in response to a detection at a specific type of feature and spatial position on the input image data. The activation map of the input image data file 405 is then passed to sub-sampling layer 416.

Sub-sampling layer 416 is responsible for weighting the sum of local regions comprised on the activation map of the input image data file 405 and more specifically, pooling. Pooling progressively reduces the spatial size of the image files activation map and reduces the number of parameters. Pooling can operate by defining a window of size (e.g., scale factor of input image file) and reducing the data in the window to a single value. Using the single value, feature abstraction weight file 422 can be established. In embodiments, one or more iterations between convolutional layer 414 and sub-sampling layer 416 can occur to establish feature abstraction weight file 422.

Feature abstraction weight file 422 represents pre-trained generic training data of original training data file 405. In embodiments, the one or more IoT devices 430 can store one copy of the pre-trained feature abstraction layer with feature abstraction weight file 422 in network 420 comprised in one or more IoT devices 430 via wire or wireless connection. In embodiments, one or more IoT devices 430 can be similar to IoT mobile device 120, IoT remote device 126, and/or IoT device 132 of FIG. 1. Feature abstraction weight file 422 can also be represented as a vector.

In embodiments, one or more classification layers 432 of the training model is uploaded to one or more IoT devices 430. In future simulations of the training model, one or more input images 440 are uploaded to classification layer 432. Relevant neural network layers relating to the image data file of the one or more new input images 440 are combined with the pre-trained feature abstraction layer 412 to dynamically form a new iteration of the training model. An iteration of the training model can comprise distinguishing and labeling relevant neural network layers for specific classes of objects relating to new input image data. GPU server 410 comprised in the back end of the IoT device can use the vector to decide the classification of each additional input image.

At one or more classification layers 432, one or more new input images 440 are first processed through one or more fully connected layers 434. In embodiments, one or more fully connected layers 434 are multi-layer artificial neurons (e.g., perceptron's) aimed to map the activation map's volume from the combination of previous different layers (e.g., convolutional sub-layer 414, sub-sampling sub-layer 416) into a class probability distribution. The output of the one or more fully connected layers 434 has output neurons. Gaussian connection 436 may tune the weight parameters of the output neurons associated with the one or more new input images 440 to create stochastic likelihood representations of each class score, based on the activation maps generated by the concatenation of feature abstraction layer 412. In embodiments, one or more iterations between fully connected layer 434 and Gaussian connection 436 can occur to establish the class score.

Each class score can be represented by new weight file 442. New weight file 442 represents the generated original weight file adjusted to represent the input class of new image 440 in one or more classification layers 432. New weight file 442 can be stored in classification layer weight file 424 comprised in network 420. Additional images can adjust the classification weight file 424 rather than restart training. Classification layer weight file 424 can then be used for inferencing the class of the one or more new input images 440 directly on the one or more IoT devices 430 when one or more neural network layers are activated based on a detection of a familiar object class of input images.

FIG. 4 is intended to represent illustrative components of an example neural network training architecture system 400 according to embodiments of the present disclosure. In some embodiments, however, individual components can have greater or lesser complexity than shown in FIG. 4, and components other than, or in addition to those shown in FIG. 4 can be present. Furthermore, in some embodiments, various components illustrated in FIG. 4 can have greater, lesser, or different functionality than shown in FIG. 4.

Figure 5:
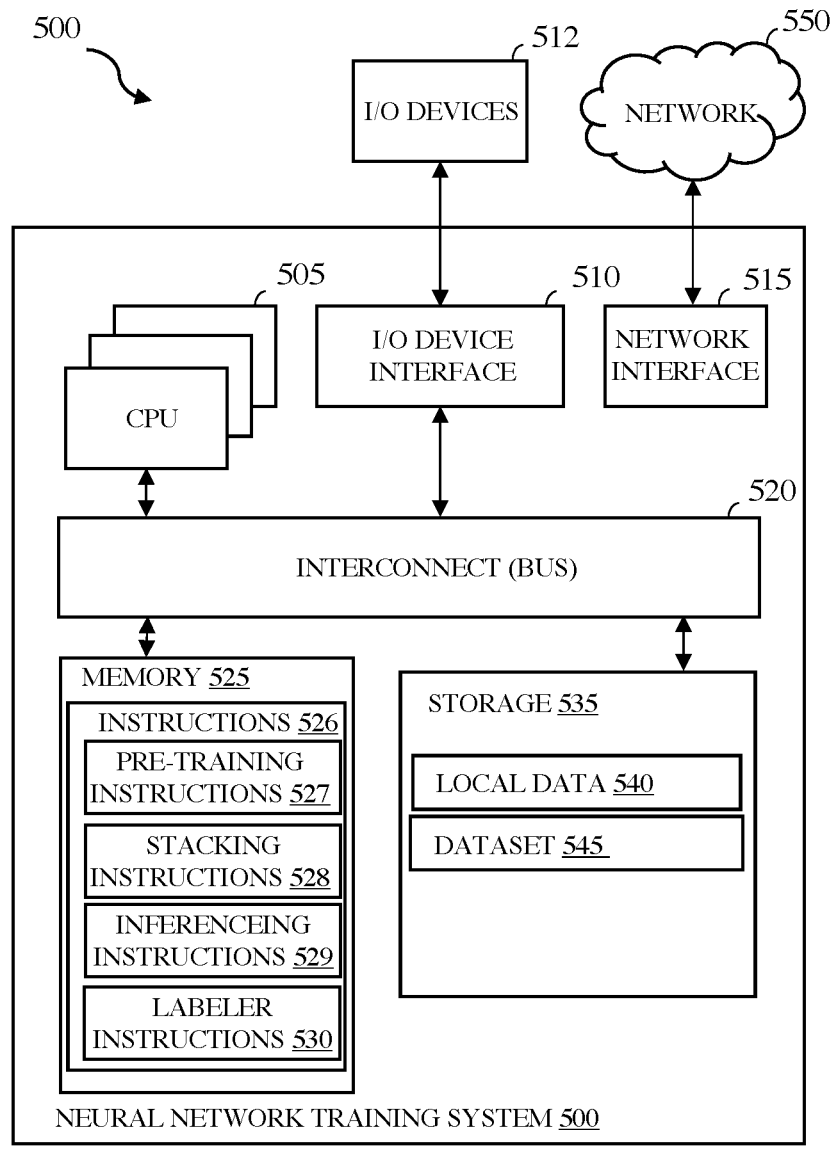
FIG. 5 illustrates a block diagram of an example neural network training system in accordance with some embodiments of the present disclosure.

FIG. 5 illustrates a block diagram of a neural network training system 500 in accordance with some embodiments of the present disclosure. In some embodiments, neural network training system 500 is consistent with neural network training system 102 of FIG. 1. In various embodiments, neural network training system 500 performs any of the actions described in FIGS. 2-4. In some embodiments, neural network training system 500 provides instructions for one or more of the actions described in FIGS. 2-4 to an IoT device such that the IoT device executes the action, or a portion of the action, based on the instructions provided by the neural network training system 500.

The neural network training system 500 includes a memory 525, storage 5435, an interconnect (e.g., BUS) 520, one or more CPUs 505 (also referred to as processors 505 herein), an I/O device interface 510, I/O devices 512, a network interface 515, and a network 550.

Each CPU 505 retrieves and executes programming instructions stored in the memory 525 or storage 535. The interconnect 520 is used to move data, such as programming instructions, between the CPUs 505, I/O device interface 510, storage 535, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 535 is generally included to be representative of a non-volatile memory, such as a hard disk drive, solid state device (SSD), removable memory cards, optical storage, or flash memory devices. In an alternative embodiment, the storage 535 can be replaced by storage area-network (SAN) devices, the cloud, or other devices connected to the anomaly detection system 500 via the I/O devices interface 510 or a network 550 via the network interface 515.

In some embodiments, the memory 525 stores instructions 560 and the storage 535 stores local data 732 and one or more dataset 545. However, in various embodiments, the instructions 560, the local data 540, and the one or more dataset 545 are stored partially in memory 525 and partially in storage 535, or they are stored entirely in memory 525 or entirely in storage 535, or they are accessed over a network 550 via the network interface 515.

Local data 540 can be consistent with local data 116 of FIG. 1. Local data 540 can store, for example, a recording of image data obtained from one or more IoT devices according to FIG. 1 (e.g., IoT mobile device 120, IoT remote device 126, and IoT device).

One or more dataset 545 can be consistent with dataset 118 of FIG. 1 and one or more dataset 300*a-c* of FIG. 3. One or more dataset 545 can store identifiable and specific classes of image data. Thus, one or more dataset 545 can be used to pre-train neural network layers comprised in an IoT device.

The instructions 526 are processor executable instructions including pre-training instructions 527, stacking instructions 528, inferencing instructions 529, and labeler instructions 530. Pre-training instructions 527 can be executed by neural network training system 500 to pre-training separate application layers in a deep learning neural network comprised in an IoT environment. Pre-training instructions 527 can be configured to perform, for example, operations 220 of FIG. 2. In some embodiments, pre-training instructions 527 are consistent with neural network layer labeler 104 and trainer 108 of FIG. 1.

Stacking instructions 528 can be executed by neural network training system 500 to conditionally stack layers of the deep learning neural network. Stacking instructions 528 can be configured to train part of the deep learning neural network for new datasets. Stacking instructions 528 can be configured to perform portions of operations 230-240 of FIG. 1*n* some embodiments, stacking instructions 528 are consistent with stacker 110 of FIG. 1.

Inferencer instructions 529 can be executed by neural network training system 500 to inference which neural network layer will be activated when new input image data is uploaded. Inferencer instructions 529 can perform portions of operations 240-250 of FIG. 2 and in some embodiments, inferencer instructions 529 are consistent with inferencer 112 of FIG. 1.

Labeler instructions 530 can be executed by neural network training system 500 to generate a label from neural network labeler layer 104. Labeler instructions 530 can perform portions of method 100 of FIG. 1 and in some embodiments, labeler instructions 530 are consistent with neural network labeler layer 104 of FIG. 1.

In various embodiments, the I/O devices 512 include an interface capable of presenting information and receiving input (e.g., GPU/CPU server 138 of FIG. 1). For example, I/O devices 512 can present information to a user (e.g., image classification) interacting with neural network training system 400.

Neural network training system 500 is connected to the network 550 via the network interface 515. In some embodiments, network 550 is consistent with network 150 of FIG. 1.

FIG. 5 is intended to represent illustrative components of an example neural network training system 500 according to embodiments of the present disclosure. In some embodiments, however, individual components can have greater or lesser complexity than shown in FIG. 5, and components other than, or in addition to those shown in FIG. 5 can be present. Furthermore, in some embodiments, various components illustrated in FIG. 5 can have greater, lesser, or different functionality than shown in FIG. 5.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
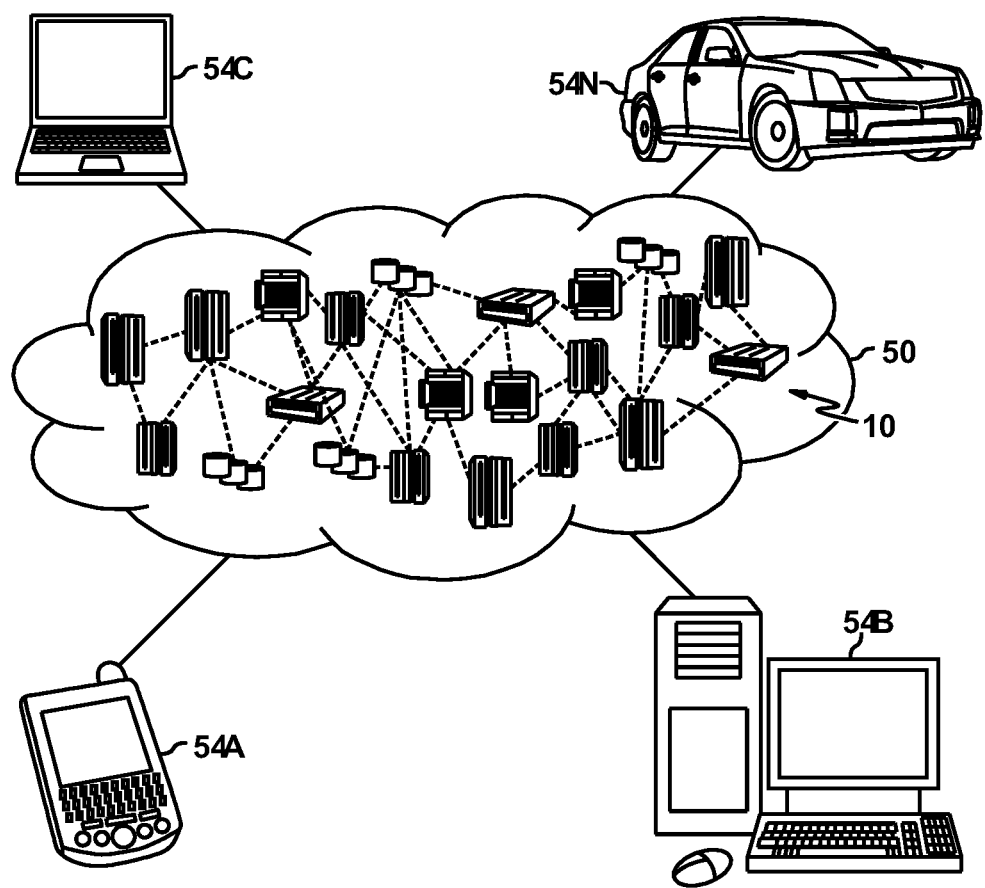
FIG. 6 depicts a cloud computing environment according to some embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 7:
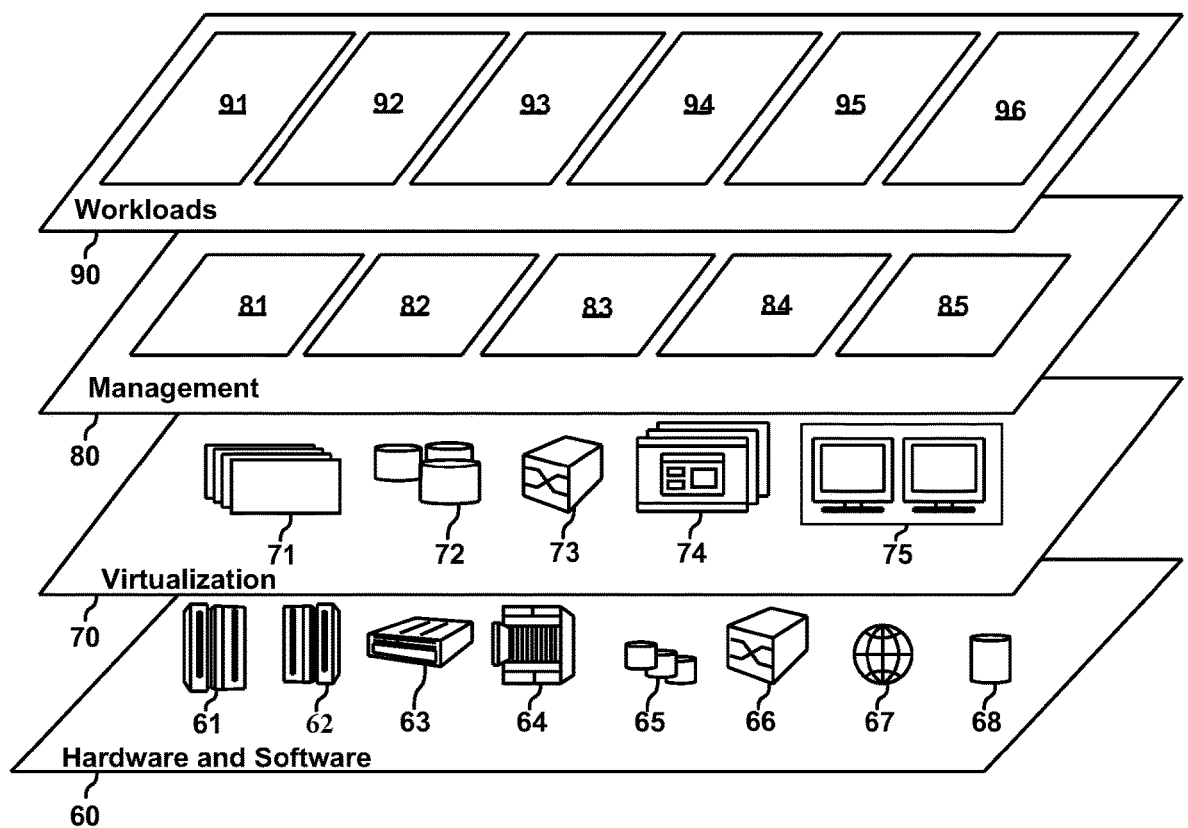
FIG. 7 depicts abstraction model layers according to some embodiments of the present disclosure.

Referring now to FIG. 7, a set of functional abstraction layers provided by cloud computing environment 50 (FIG. 6) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and neural networking 96.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any subset of the functionality described with respect to FIGS. 1-7) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

What is claimed is:

1. A computer-implemented method comprising:
   dividing, by a training system, a computational training work load of one or more neural network layers into a first layer and a second layer, wherein the first layer comprises one or more first sub-layer sequences including a feature abstraction layer, and wherein the second layer comprises one or more second sub-layer sequences including one or more classification layers;
   pre-training, by a server, the one or more neural network layers with a first class of image data sensitive to an original known dataset, wherein pre-training creates identifiable labels for the one or more neural network layers;
   generating, by the server and in response to the pre-training, a first weight file from the first layer of the neural network based on the first class of image data sensitive to the original known dataset;
   loading the one or more pre-trained neural network layers and the generated first weight file into the front-end of at least one Internet of Things (IoT) device;
   stacking, at the front-end of the at least one IoT device one or more classification layers of the second layer with the first layer of the neural network to form a new training system for an uploaded new dataset, wherein the one or more classification layers of the second layer are based on a target claim of the neural network and the uploaded new dataset;
   adjusting, in the second layer, the generated first weight file based on an input of one or more new classes of image data comprised in the uploaded new dataset to generate a new second weight file;
   inferencing, directly on the at least one IoT device, an object class of new image data comprised on the uploaded new dataset using the generated new second weight file; and
   outputting, at the back end of the IoT device, the inferenced object class of the new image data.

2. The method of claim 1, wherein the method further comprises:
   storing one pre-trained copy of the first layer with the first weight file;
   storing one or more pre-trained second layers with one or more corresponding new weight files;
   forming one or more subsequent labeled neural network layers in the front-end of the at least one IoT device, wherein the one or more subsequent labeled neural network layers use the one pre-trained copy of the first layer with the first weight file and the one or more pre-trained second layers with the one or more corresponding new weight files based on one or more classes of objects to adapt to one or more unidentified classes of objects.

3. The method according to claim 1, wherein the one or more first sub-layer sequences comprise one or more iterations between a convolutional layer and a sampling layer;
   wherein the one or more second sub-layer sequences comprise one or more iterations between a fully connected layer and Gaussian connection; and
   wherein the target claim of the neural network is based on an input from a user of the neural network.

4. The method according to claim 1, wherein pre-training the one or more neural network layers occurs in the front end of the at least one IoT device, wherein the pre-trained front-end neural network layers are sensitive to one or more classes of objects in a new dataset, wherein the pre-trained front-end neural network layers are identifiable by one or more generated labels, wherein the pre-trained front-end neural network layers are stackable, wherein the pre-trained front-end neural network layers are activated when previously identified image data is detected in the uploaded new dataset.

5. The method according to claim 1, wherein stacking establishes one or more separate application level neural network layers, wherein stacking the one or more pre-trained neural network labeled layer occurs in the front-end of the at least one IoT device.

6. The method according to claim 1, wherein the at least one IoT device comprises one of a mobile device and a remote device.

7. The method according to claim 1, wherein image data comprised on one or more datasets comprises a plurality of graphics and a plurality of motion recordings, wherein the plurality of graphics represents one or more class of images, wherein the plurality of motion recordings represents a task.

8. The method according to claim 1, wherein the at least one IoT device comprises one of a mobile device and a remote device; and
   wherein image data comprised on one or more datasets comprises a plurality of graphics and a plurality of motion recordings, wherein the plurality of graphics represents one or more class of images, wherein the plurality of motion recordings represents a task.

9. A computer-implemented system comprising:
   a computer readable storage medium storing a corpus of data; and
   a processor communicatively coupled to the computer readable storage medium and the user interface and having a memory comprising instructions which, when executed by the processor, cause the processor to:

divide, by a training system, a computational training work load of one or more neural network layers into a first layer and a second layer, wherein the first layer comprises one or more first sub-layer sequences including a feature abstraction layer, and wherein the second layer comprises one or more second sub-layer sequences including one or more classification layers;

pre-train, by a server, the one or more neural network layers with a first class of image data sensitive to an original known dataset, wherein pre-training creates identifiable labels for the one or more neural network layers;

generate, by the server and in response to the pre-training, a first weight file from the first layer of the neural network based on the first class of image data sensitive to the original known dataset;

load the one or more pre-trained neural network layers and the generated first weight file into the front-end of at least one Internet of Things (IoT) device;

stack, at the front-end of the at least one IoT device one or more classification layers of the second layer with the first layer of the neural network to form a new training system for an uploaded new dataset, wherein the one or more classification layers of the second layer are based on a target claim of the neural network and the uploaded new dataset;

adjust, in the second layer, the generated first weight file based on an input of one or more new classes of image data comprised in the uploaded new dataset to generate a new second weight file;

inference, directly on the at least one IoT device, an object class of new image data comprised on the uploaded new dataset using the generated new second weight file; and output, at the back end of the IoT device, the inferenced object class of the new image data.

10. The system according to claim 9, wherein the system further comprises:

storing one pre-trained copy of the first layer with the first weight file;

storing one or more pre-trained second layers with one or more corresponding new weight files;

forming one or more subsequent labeled neural network layers in the front-end of the at least one IoT device, wherein the one or more subsequent labeled neural network layers use the one pre-trained copy of the first layer with the first weight file and the one or more pre-trained second layers with the one or more corresponding new weight files based on one or more classes of objects to adapt to one or more unidentified classes of objects.

11. The system according to claim 9, wherein the one or more first sub-layer sequences comprise one or more iterations between a convolutional layer and a sampling layer;

wherein the one or more second sub-layer sequences comprise one or more iterations between a fully connected layer and Gaussian connection; and wherein the target claim of the neural network is based on an input from a user of the neural network.

12. The system according to claim 9, wherein pre-training the one or more neural network layers occurs in the front end of the at least one IoT device, wherein the pre-trained front-end neural network layers are sensitive to one or more classes of objects in a new dataset, wherein the pre-trained front-end neural network layers are identifiable by one or more generated labels, wherein the pre-trained front-end neural network layers are stackable, wherein the pre-trained front-end neural network layers are activated when previously identified image data is detected in the uploaded new dataset.

13. The system according to claim 9 wherein stacking establishes one or more separate application level neural network layers, wherein stacking the one or more pre-trained neural network labeled layer occurs in the front-end of the at least one IoT device.

14. The system according to claim 9, wherein the at least one IoT device comprises one of a mobile device and a remote device.

15. The system according to claim 9, wherein image data comprised on one or more datasets comprises a plurality of graphics and a plurality of motion recordings, wherein the plurality of graphics represents one or more class of images, wherein the plurality of motion recordings represents a task.

16. A computer-implemented program product comprising a computer readable storage medium having program instructions embodied therewith, the program instructions executable by a processor to cause the processor to:

divide, by a training system, a computational training work load of one or more neural network layers into a first layer and a second layer, wherein the first layer comprises one or more first sub-layer sequences including a feature abstraction layer, and wherein the second layer comprises one or more second sub-layer sequences including one or more classification layers;

pre-train, by a server, the one or more neural network layers with a first class of image data sensitive to an original known dataset, wherein pre-training creates identifiable labels for the one or more neural network layers;

generate, by the server and in response to the pre-training, a first weight file from the first layer of the neural network based on the first class of image data sensitive to the original known dataset;

load the one or more pre-trained neural network layers and the generated first weight file into the front-end of at least one Internet of Things (IoT) device;

stack, at the front-end of the at least one IoT device one or more classification layers of the second layer with the first layer of the neural network to form a new training system for an uploaded new dataset, wherein the one or more classification layers of the second layer are based on a target claim of the neural network and the uploaded new dataset;

adjust, in the second layer, the generated first weight file based on an input of one or more new classes of image data comprised in the uploaded new dataset to generate a new second weight file;

inference, directly on the at least one IoT device, an object class of new image data comprised on the uploaded new dataset using the generated new second weight file; and output, at the back end of the IoT device, the inferenced object class of the new image data.

17. The computer program product according to claim 16, wherein the computer program product further comprises:

storing one pre-trained copy of the first layer with the first weight file;

storing one or more pre-trained second layers with one or more corresponding new weight files;

forming one or more subsequent labeled neural network layers in the front-end of the at least one IoT device, wherein the one or more subsequent labeled neural network layers use the one pre-trained copy of the first layer with the first weight file and the one or more pre-trained second layers with the one or more corresponding new weight files based on one or more classes of objects to adapt to one or more unidentified classes of objects.

18. The computer program product according to claim 16, wherein the one or more first sub-layer sequences comprise one or more iterations between a convolutional layer and a sampling layer;
    wherein the one or more second sub-layer sequences comprise one or more iterations between a fully connected layer and Gaussian connection; and
    wherein the target claim of the neural network is based on an input from a user of the neural network.

19. The computer program product according to claim 16, wherein pre-training the one or more neural network layers occurs in the front end of the at least one IoT device, wherein the pre-trained front-end neural network layers are sensitive to one or more classes of objects in a new dataset, wherein the pre-trained front-end neural network layers are identifiable by one or more generated labels, wherein the pre-trained front-end neural network layers are stackable, wherein the pre-trained front-end neural network layers are activated when previously identified image data is detected in the uploaded new dataset.

20. The computer program product according to claim 16, wherein stacking establishes one or more separate application level neural network layers, wherein stacking the one or more pre-trained neural network labeled layer occurs in the front-end of the at least one IoT device.

* * * * *